United States Patent
Santucci et al.

(10) Patent No.: US 11,650,092 B2
(45) Date of Patent: May 16, 2023

(54) METHOD AND SYSTEM FOR ESTIMATING THE VOLUME OF FUEL CONTAINED IN A TANK OF A TRANSPORT VEHICLE

(71) Applicant: PIAGGIO & C. SPA, Pontedera (IT)

(72) Inventors: Mario Santucci, Pontedera (IT); Paolo Badalassi, Pontedera (IT)

(73) Assignee: PIAGGIO & C. S.P.A, Pontedera (IT)

( * ) Notice: Subject to any disclaimer, the term of this patent is extended or adjusted under 35 U.S.C. 154(b) by 361 days.

(21) Appl. No.: 16/758,913

(22) PCT Filed: Nov. 12, 2018

(86) PCT No.: PCT/IB2018/058862
§ 371 (c)(1),
(2) Date: Apr. 24, 2020

(87) PCT Pub. No.: WO2019/097388
PCT Pub. Date: May 23, 2019

(65) Prior Publication Data
US 2020/0348162 A1  Nov. 5, 2020

(30) Foreign Application Priority Data

Nov. 15, 2017 (IT) .......................... 102017000130318

(51) Int. Cl.
*G01F 22/00* (2006.01)
*B62J 50/22* (2020.01)
(Continued)

(52) U.S. Cl.
CPC .............. *G01F 22/00* (2013.01); *B62J 50/22* (2020.02); *G01P 15/18* (2013.01); *B62J 35/00* (2013.01); *B62J 45/20* (2020.02); *B62J 45/414* (2020.02)

(58) Field of Classification Search
None
See application file for complete search history.

(56) References Cited

U.S. PATENT DOCUMENTS 4,811,595 A * 3/1989 Marciniak ............... G01F 22/02
73/290 V
6,339,960 B1  1/2002 Costley
(Continued)

FOREIGN PATENT DOCUMENTS

EP        1001155 A1     5/2000
KR   20030018927 A     3/2003

OTHER PUBLICATIONS

International Search Report for corresponding application filed PCT/IB2018/058862 filed Nov. 12, 2018; dated Mar. 8, 2019.
(Continued)

*Primary Examiner* — Daniel L Greene
(74) *Attorney, Agent, or Firm* — Cantor Colburn LLP

(57) ABSTRACT

A method (100) for estimating a volume of fuel available in a fuel tank (6) of a transport vehicle (1), the tank (6) comprising a tank wall inside which a space is defined for containing fuel, the method (100) comprising, in sequence, the steps of: a) exciting (101) a vibration of the tank (6); b) acquiring (102) a response signal correlated to a frequency response produced by the tank (6) due the excited vibration; c) processing (103) the acquired response signal to obtain an estimate of the initial volume of fuel available in the tank (6); d) gradually taking (104) fuel from the tank (6) with the transport vehicle (1) in use; e) estimating (105) a quantity of fuel taken gradually from the tank (6); f) estimating (106) the volume of fuel available in the tank (6) based on the initial volume and quantity estimate of fuel taken gradually.

16 Claims, 2 Drawing Sheets

(51) Int. Cl.
  *G01P 15/18* (2013.01)
  *B62J 45/20* (2020.01)
  *B62J 45/414* (2020.01)
  *B62J 35/00* (2006.01)

(56) References Cited

U.S. PATENT DOCUMENTS

| | | | |
|---|---|---|---|
| 9,445,639 B1* | 9/2016 | Aloumanis | G02B 27/017 |
| 2003/0069684 A1* | 4/2003 | Reimer | G01F 23/296 |
| | | | 701/123 |
| 2006/0021448 A1 | 2/2006 | Young | |
| 2009/0211349 A1* | 8/2009 | Kawakita | G01F 23/804 |
| | | | 73/114.54 |
| 2012/0097088 A1* | 4/2012 | Guerrier | B63B 39/005 |
| | | | 114/256 |
| 2018/0238728 A1* | 8/2018 | Young | G01F 23/2966 |

OTHER PUBLICATIONS

Written Opinion of the International Search Authority for corresponding application filed PCT/IB2018/058862 filed Nov. 12, 2018; dated Mar. 8, 2019.

* cited by examiner

METHOD AND SYSTEM FOR ESTIMATING THE VOLUME OF FUEL CONTAINED IN A TANK OF A TRANSPORT VEHICLE

DESCRIPTION

The present description relates to the technical field of transport vehicles and in particular, it relates to a method and system for estimating the volume of fuel contained in a tank of a transport vehicle.

In tanks for fuel liquid installed on transport vehicles with thermal engines, immersion or floatation devices, inserted in the tank, are commonly used to measure the fuel available in the tank. Such known devices do not measure the volume of liquid present in the tank directly, but the height of the free surface thereof, obtaining the volume through a geometric correlation; it is no coincidence that they are called fuel level and not volume indicator devices.

The correlation between piezometric level and volume can be complex to the point of making the indication of the quantity of fuel available imprecise, depending on the shape of the tank, which is often irregular for reasons of size.

The fuel level indicator devices of the prior art also require relatively elevated production and tank maintenance costs. Furthermore, the estimate of the volume of fuel obtained by means of said devices is affected by further imprecisions, due to the inclination of the transport vehicle, which is influenced by the distribution of the loads on board and by the slope of the surface on which the transport vehicle is standing or traveling.

It is a general object of the present description to provide a method for estimating the volume of fuel in the tank of a transport vehicle, which is such as to overcome the above described limitations with reference to the prior art.

These and other objects are achieved by means of a method of estimation as defined in claim 1 in its most general form and in the claims dependent thereon in some particular embodiments thereof.

The invention will be better understood from the following detailed description of embodiments thereof, given by way of example and thus not limiting, relating to the accompanying drawings, wherein.

Identical or similar elements have been indicated in the appended figures with the same numerical references.

Figure 1:
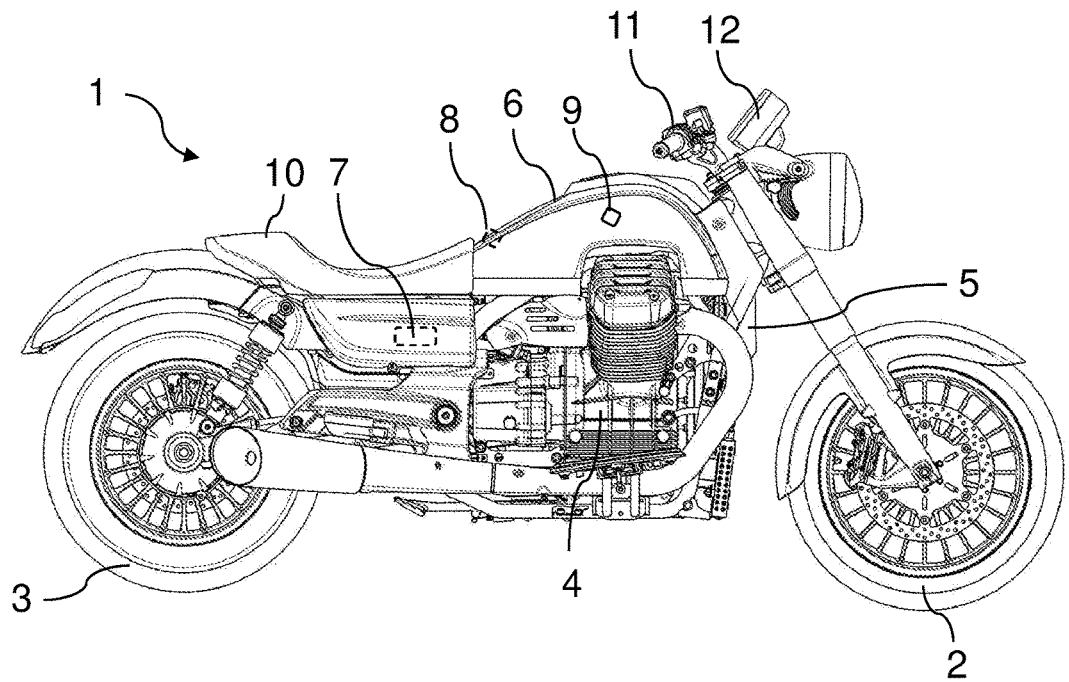
FIG. 1 shows a schematic side view of a non-limiting embodiment of a transport vehicle, in particular a motorcycle, comprising a fuel tank.

An embodiment of a transport vehicle and, in particular a motorcycle 1, is shown in the appended figures. In the particular example represented in the figures, the motorcycle 1 takes the form, without introducing limitations, of a motorbike 1 with two wheels, comprising a front wheel 2 and a back wheel 3, an internal combustion engine 4, a supporting frame 5, a fuel tank 6, which, in the example, is fixed to the supporting frame 5, an electronic control unit 7 or ECU of the internal combustion engine 4, a saddle 10 and steering handlebars 11 rotatably fixed to the supporting frame 5. The motorcycle 1 further comprises a control dashboard 12, which is operatively connected to the electronic control unit 7.

In accordance with an embodiment, the internal combustion engine 4 is a traction motor of the motorcycle 1 and for this reason, it is directly or indirectly operatively connected to a traction wheel of the motorcycle 1, in the example, to the rear wheel 3. In accordance with an alternative embodiment, the internal combustion engine 4 is not a traction motor, but an electric generator, for example, responsible for recharging a rechargeable battery pack of an electric traction transport vehicle.

Note, however, that the teachings of the present description are not limited to being exclusively applied to motorcycles, as they can also be applied to other transport vehicles in general, herein including cars.

The fuel tank 6 is adapted and configured to contain a liquid fuel, for example, gasoline. In a variation, wherein, for example, the transport vehicle 1 is a car, the liquid fuel is diesel, for example.

The fuel tank 6 comprises a tank wall inside which a closed space is defined for containing the fuel. In a known manner, the tank wall is made, for example, of metal material or of an alloy of metal materials. In an alternative embodiment, the tank wall is made of plastic material, for example, if, in contrast to the example shown in FIG. 1, the fuel tank 6 is not exposed and visible. The aforesaid plastic material is, for example, polypropylene.

In accordance with an embodiment, the fuel tank 6 can contain a fuel suction pump therein, which is adapted and configured to be electronically controlled by the electronic control unit 7—ECU—to perform a controlled withdraw of the fuel from the tank 6, to supply the internal combustion engine 4.

Figure 3:
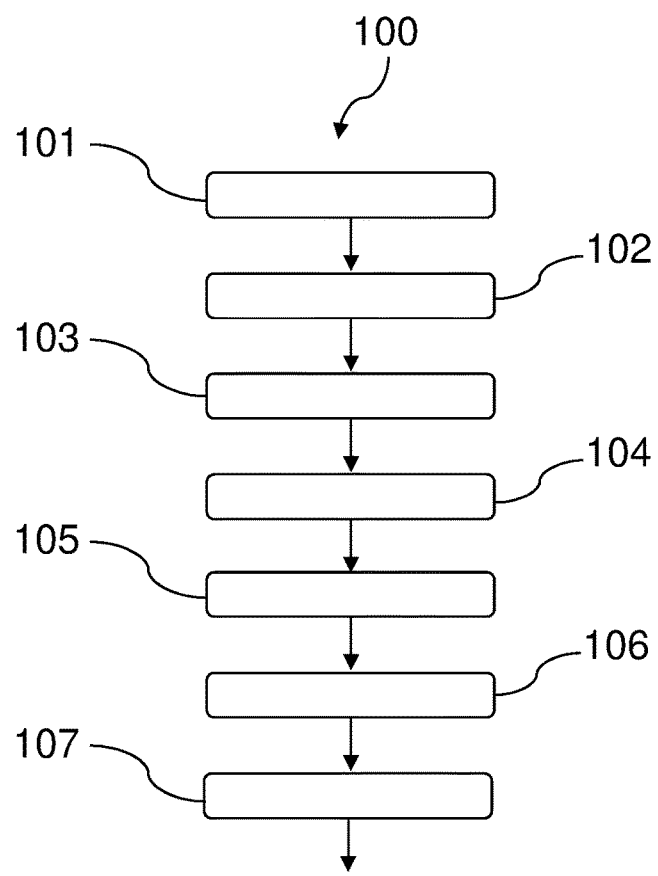
FIG. 3 shows a schematic flow diagram of an embodiment of a method for estimating a volume of fuel available in the tank of the transport vehicle in FIGS. 1 and 2.

In accordance with a preferred embodiment, the electronic control unit 7—ECU—comprises a computer code on board, or rather, a program, which can be loaded into a memory and whose instructions are executed by the electronic control unit 7 to implement an estimation method 100 of the volume of fuel available in the tank 6, whose flow diagram is schematically represented in FIG. 3.

The estimation method 100 comprises the steps of:
a) exciting 101 a vibration of the fuel tank 6;
b) acquiring 102 a response signal correlated to a frequency response produced by the tank 6 due to the excited vibration;
c) processing 103 the acquired response signal to obtain an estimate of the initial volume of fuel available in the tank 6;
d) gradually taking 104 fuel from the tank 6 when the transport vehicle 1 is in use;
e) estimating 105 a quantity of fuel taken gradually from the tank 6; and
f) estimating 106 the volume of fuel available in the tank 6 based on the initial volume and estimate of the quantity of fuel gradually taken.

In this latter step, for example, an operation of subtraction is performed between a quantity representing the initial volume and a quantity representing the estimate of the quantity of fuel gradually taken, that is:

Volume available=Initial volume−Volume taken.

The aforesaid operation can be carried out periodically, at small intervals of time, as desired, for example, every 60 seconds or every 30 seconds, etc.

In the estimation method 100, the aforesaid steps 101-106 are preferably performed in the time sequence corresponding to the order in which they were described above and according to the time sequence they were schematically represented in FIG. 3.

In accordance with an embodiment, if the transport vehicle 1 comprises a dashboard 12 having a visual indicator of the fuel tank 6 filling level, advantageously, the estimation method 100 comprises a step 107 of showing in said visual indicator an estimate of the remaining fuel, by controlling said visual indicator by means of a control signal obtained according to said estimation of the volume of fuel available obtained in the estimation step 106.

In accordance with an advantageous embodiment, step 105 of estimating the quantity of fuel gradually taken from the tank 6 is carried out by the electronic control unit 7, or ECU, of the internal combustion engine 4. As is known, an ECU 7 acquires considerable information from a transport vehicle, such as:

suction inlet air temperature;
cooling fluid temperature (if provided);
opening butterfly (called "alpha"); —
number motor revs (called "n");
various other quantities, which are of no interest for the purposes of the present description.

Based on the above information, instant by instant, the ECU chooses an "engine map" (called alpha/n), which correlates the point in which the internal combustion engine 4 is operating with the opening time of the fuel injection valve. Given that the supply pressure is constant, as well as the volumetric flow, the regulation of the quantity of fuel occurs through the injector opening time. The sum of the relevant injection times determines, with great precision, the quantity of petrol injected in the engine 4 in a time range of interest. This allows an estimate of the quantity of fuel taken from the tank 6 to be made with particularly elevated precision.

In accordance with an advantageous embodiment, the step of exciting 101 the vibration is carried out by applying an impact on an external surface of the containment wall of the tank 6, preferably a single pulse or train of pulses impulse impact. Such impact is produced, for example, by an exciter 8 controlled by the electronic control unit 7. The exciter 8 is, for example, an electro-mechanical transducer and includes, for example, a linear electro-magnetic motor comprising a striker or piston, which represents the movable apparatus of the electro-magnetic motor. In an alternative embodiment, the exciter 8 is, for example, a piezoelectric transducer.

In an alternative embodiment, in the exciting step 101, an impact is not applied to the tank 6, as it is sufficient to make the tank 6 vibrate, for example, by inducing the vibration therein produced by another device coupled thereto, such as, for example, a fuel suction pump inside or outside the tank 6. As is known, such fuel suction pump can be controlled, for example, by the electronic control unit 7—ECU—, so as to start up automatically on switching on the transport vehicle 1 dashboard 12.

Advantageously, the step 102 of acquiring the response signal is performed by means of an acceleration sensor 9 preferably fixed to the external surface of the fuel tank 6. In this case, the acquired response signal is an accelerometric signal.

In an alternative embodiment, said step 102 of acquiring the response signal is performed by means of a vibro-acoustic sensor or a hydrophonic sensor, the latter being arranged in the tank 6 and not on the tank wall.

In accordance with an embodiment, if the aforesaid impact is applied by means of an exciter 8 fixed to the external surface of the fuel tank 6, it is advantageous to provide the exciter 8 and the acceleration sensor 9 applied in two areas of the external surface of the tank 6, spaced apart from each other.

Figure 2:
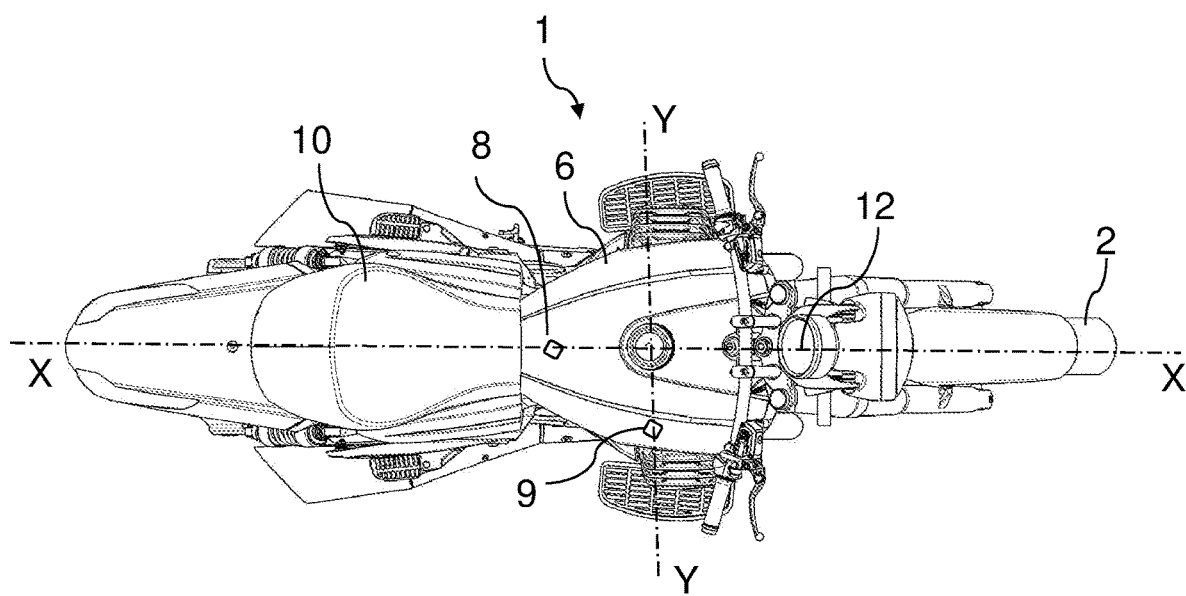
FIG. 2 shows a plan view from above of the transport vehicle in FIG. 1.

Furthermore, with reference to FIG. 2, it has emerged from experimental tests that it is advantageous to apply an impact to the tank 6 along an X-X impact axis and acquire an acceleration component along a transverse Y-Y axis, preferably perpendicular to the X-X impact axis. For this reason, it is sufficient to use a single axis acceleration sensor 9. Alternatively, it is possible to use a triaxial acceleration sensor 9 and extract the acceleration component from the acquired signal along a predetermined axis, for example, a Y-Y axis perpendicular to the X-X impact axis.

In accordance with a particularly advantageous embodiment, the step of exciting 101 and the step of acquiring 102 are carried out before starting the transport vehicle 1, in particular, before switching on the internal combustion engine 4. In this way, external vibrations caused, for example, by the road surface or by the internal combustion engine 4 do not affect the measurement. If the transport vehicle 1 is equipped with a start & stop system, it is advantageous to repeat the steps of exciting 101, the step of acquiring 102 and, if necessary, also the step of processing 103 in the stop state, at any time before the passage of the system to the start state, in other words, to the state of restarting the engine.

In accordance with an advantageous embodiment, the step 103 of processing the acquired response signal to obtain an estimate of the initial volume of fuel available in the tank 6 comprises an operation of comparing information obtained from the acquired response signal with previously acquired information, obtained by characterizing the tank 6. Said characterization occurs by evaluating a plurality of tank 6 frequency responses obtained by exciting vibrations in the tank 6 in conditions of respective different filling levels of the tank and 6 acquiring respective response signals. The above information allows a look-up table to be created, for example, in which, with a discretization step as small as desired, as desired, it is possible to associate respective response frequencies (or oscillation frequencies) of the tank 6 with each of a plurality of tank 6 filling volumes. The creation of the look up table is carried out, for example, in the factory, by characterizing the different types of tanks, preferably when they are already installed on the respective transport vehicles. Preferably, the look-up table is built to memorize a respective oscillation frequency for each tank 6 filling volume, wherein said oscillation frequency is the frequency of the first oscillation mode of the tank.

Figure 4:
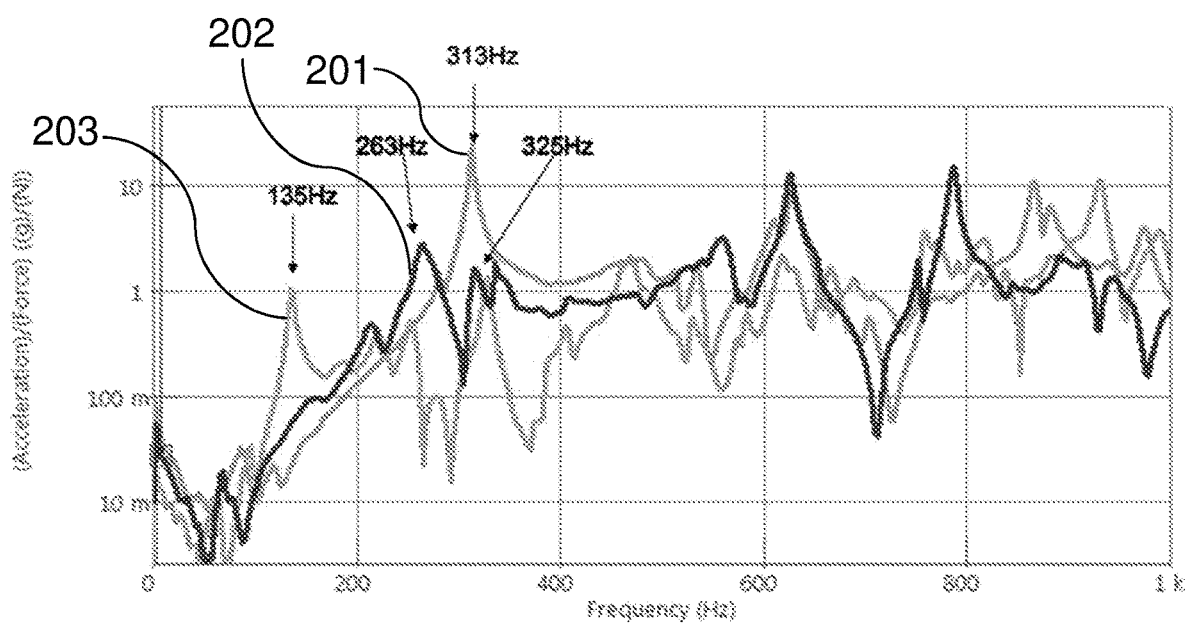
FIG. 4 shows a diagram obtained by means of experimental tests.

In accordance with a preferred embodiment, the step 103 of processing the acquired response signal to obtain an estimate of the initial volume of fuel available in the tank 6 comprises an operation of calculating data correlated to a maximum amplitude of a frequency response function. Preferably, said maximum is an absolute maximum in a range of selected frequencies. More preferably, said selected frequency range has an upper limit given by a maximum response frequency, or frequency of the first oscillation mode of the tank, when the tank 6 is empty. The diagram in FIG. 4 was obtained by means of experimental measurements and three frequency response functions are represented therein, given by the relationships between the recorded acceleration module and the impact force applied based on the frequency, in which the three functions were obtained with three different tank filling levels: tank empty (function 201), tank half-full (function 202), tank full (function 203). As can be observed, each of the three functions 201, 202, 203 has clear maximums at the frequency of the first oscillation mode of the tank 6. To simplify the processing, in the estimation method 100 it is sufficient to evaluate the response acquired in a range of selected frequencies. In the specific example, such range is from 135 Hz (which represents the frequency of the first oscillation mode of the tank when the tank is full) to 313 Hz (which represents the frequency of the first oscillation mode of the tank when the tank is empty).

Based on the above explanation it is thus possible to understand how an estimation method 100 of the type described above allows the objects stated above with reference to the state of the prior art to be achieved.

In fact, due to the aforesaid estimation method 100, it is possible, for example, before starting the internal combustion engine 4 of the transport vehicle 1, to estimate an initial volume of fuel contained in the tank 6, without using immersion or float systems, and then, after starting the vehicle 1 and during the driving of the same, measure or estimate the quantity of fuel gradually taken and subtract it from the initial estimate, to estimate the volume of fuel remaining, in real time, or in near-real time. It was observed that the estimate provided was extremely precise.

Note that, although it is advantageous to perform steps 101, 102 and possibly 103 with the engine off, it does not constitute an essential feature, because with an appropriate analysis of the acquired signal, for example, using filter or cancellation processing techniques, the information relating to the tank 6 frequency response could nonetheless be isolated from the acquired response signal.

Note that the description detailed above for the estimation method 100 also corresponds to the description of a system 7,8,9 for estimating a volume of fuel available in a fuel tank 6 of a transport vehicle 1, the fuel tank 6 comprising a tank wall inside which a containment space is defined for containing fuel, the system 7,8,9 comprising:
- an exciter 8 adapted and configured to excite a vibration of the tank wall;
- an acquisition and processing unit 7,9 adapted and configured to: acquire a response signal correlated to the frequency response produced by the tank 6 due to the excited vibration, to process the acquired response signal to obtain an estimate of the initial volume of fuel available in the tank 6, to estimate a quantity of fuel gradually taken from the tank and estimate the volume of fuel available in the tank according to the initial volume and estimate of the quantity gradually taken. Further advantageous features of the aforesaid system can be directly deduced from the features described above for the estimate method 100.

For example, in the above estimation system 7,8,9 the aforesaid acquisition and processing unit 7,9 comprises the electronic control unit 7 and sensor 9 and clearly the relative means for interconnecting between such items, for example, electrical conductors, such as electric cables.

Without undermining the principle of the invention, the embodiments and production details can vary greatly with respect to description and illustration given purely by way of a non-limiting example, without going beyond the scope of the invention, as defined in the appended claims.

The invention claimed is:

1. A method for estimating a volume of fuel available in a fuel tank of a transport vehicle, the tank comprising a tank wall inside which a space is defined for containing fuel, the method comprising the steps of:
   a) exciting a vibration of the fuel tank;
   b) acquiring a response signal correlated to a frequency response produced by the fuel tank due to the excited vibration;
   c) processing the acquired response signal to obtain an estimate of the initial volume of fuel available in the tank;
   d) gradually taking fuel from the tank with the transport vehicle in use;
   e) estimating a quantity of fuel taken gradually from the fuel tank; and
   f) estimating the volume of fuel available in the tank based on the initial volume and estimate of the quantity of fuel taken gradually;
   wherein said step e) is performed by an electronic control unit of an internal combustion engine of said transport vehicle; and
   wherein, instant by instant, said electronic control unit chooses an engine map which correlates a point in which the internal combustion engine is operating with an opening time of a fuel injection valve, being a supply pressure and a volumetric flow constant, and performs the sum of the relevant injection times, thus determining the quantity of fuel injected in the internal combustion engine in a time range of interest.

2. A method according to claim 1, wherein said step of exciting a) and said step of acquiring b) are performed before starting the transport vehicle.

3. A method according to claim 1, wherein step c) of processing the acquired response signal, to obtain an estimate of the initial volume of fuel available in the tank comprises an operation of comparing information obtained from said response signal with previously acquired information, obtained by characterizing the tank evaluating a plurality of tank frequency responses obtained by exciting vibrations of the tank in conditions of respective different tank filling volumes and acquiring respective response signals.

4. A method according to claim 1, wherein the transport vehicle comprises a dashboard having a visual indicator of the fuel tank (6) filling level and wherein the method comprises a step e) of showing, in said visual indicator, an estimate of the fuel available, by controlling said visual indicator by means of a control signal obtained according to said estimate of the volume of fuel available obtained in said step f) of estimating.

5. A method according to claim 1, wherein the transport vehicle (1) is a motorcycle, preferably a moped or a motorbike.

6. A method according to claim 1, wherein said step f) of estimating a quantity of fuel taken gradually, is performed by the electronic control unit.

7. A method according to claim 1 or 2, wherein said step a) of exciting said vibration is performed by applying an impact to an external surface of the containment wall, preferably a single pulse or train of pulses impulse impact.

8. A method according to claim 7, wherein step b) of acquiring a response signal is performed by means of an acceleration sensor preferably fixed to said external surface of the fuel tank and wherein said response signal is an accelerometric signal.

9. A method according to claim 8, wherein said impact is applied by means of an exciter fixed to said external surface and wherein the exciter and the acceleration sensor (9) are applied in two areas of said external surface, spaced apart from each other.

10. A method according to claim 1, wherein said step c) of processing the acquired response signal to obtain an estimate of the initial volume of fuel available in the tank comprises an operation of calculating data correlated to a maximum of a frequency response function.

11. A method according to claim 10, wherein said maximum is an absolute maximum in a range of selected frequencies.

12. A method according to claim 11, wherein said frequency range has an upper limit given by a maximum response frequency, or frequency of the first oscillation mode of the tank, when the tank is empty.

13. A system for estimating a volume of fuel available in a fuel tank of a transport vehicle having an internal combustion engine, the fuel tank comprising a tank wall inside which a space is defined for containing fuel, the system comprising:
  an exciter device adapted and configured to excite a vibration of the tank wall;
  an acquisition and processing unit adapted and configured to acquire a response signal, correlated to the frequency response produced by the tank due to the excited vibration, to process the acquired response signal to obtain an estimate of the initial volume of fuel available in the tank, estimating a quantity of fuel gradually taken from the tank (6) and estimating the volume of fuel available in the tank based on the initial volume and quantity estimate gradually taken;
  wherein said acquisition and processing unit comprises an electronic control unit of said internal combustion engine configured to:
  instant by instant, choose an engine map which correlates the point in which the internal combustion engine is operating with an opening time of a fuel injection valve;
  being a supply pressure and a volumetric flow constant, perform a sum of the relevant injection times, thus determining the quantity of fuel injected in the internal combustion engine in a time range of interest.

14. A transport vehicle comprising a fuel tank and a system according to claim 13 for estimating a volume of fuel available in the fuel tank.

15. A transport vehicle according to claim 14, further comprising a dashboard having a display unit adapted and configured to display data correlated to said estimate of the volume of fuel available in the tank.

16. A transport vehicle according to claim 14 or 15, wherein said transport vehicle is a motorcycle.

* * * * *